United States Patent Office 2,861,004
Patented Nov. 18, 1958

2,861,004

CONSTRUCTION AND COATING MATERIALS

Glenn Sucetti, Grass Valley, Calif.

No Drawing. Application July 31, 1956
Serial No. 601,114

16 Claims. (Cl. 106—277)

This invention relates to plastic construction materials and to plastic coating and overlayment materials in which the bodying material or filler is a mineral aggregate and the bonding agent is Portland cement or the like.

This application is a continuation-in-part of my copending application Serial No. 422,994, filed April 13, 1954, entitled "Overlayment Material," hereinafter referred to as the "parent application."

In my parent application there is described and claimed a plastic product comprising an aggregate treated with calcium chloride solution and then with a stabilized, mixing type bituminous emulsion. The aggregate may vary from an aggregate consisting entirely of porous mineral particles (e. g., expanded vermiculite, expanded perlite, Haydite, scoria, pumice or the like) to a mixture predominating in a dense, nonporous aggregate such as sand or gravel mixed with a small amount, e. g., 10% of porous aggregate. The bituminous emulsion is preferably an asphalt emulsion prepared in accordance with Buckley U. S. Patent No. 2,256,886, the stabilizing agent being Vinsol Resin. Further identification of Vinsol Resin will be found in the said parent application, in the said Buckley patent and in Maters U. S. Patents Nos. 2,199,206 and 2,155,141. Very briefly, Vinsol Resin is a saponified petroleum insoluble, solvent extracted pine wood resin which is characterized by freedom from wood rosin, solubility in alcohol, a methoxy content of about 3 to 6%, an acid number of about 100 and a melting point of about 125° C.

The present invention relates to improvements upon the invention of my parent application. More particularly the present invention relates to the production of treated aggregates which can be easily introduced into bags; which can be stored, shipped and handled in bags of the type consisting of outer plies of paper and an interior ply of polyethylene film without water damage to the bags; which can be poured easily from the bags when desired and can be easily mixed with water and Portland cement; and which, when mixed with water and Portland cement, will produce a concrete which is excellent for overlayment purposes.

In one embodiment the invention comprises a composition of matter consisting essentially of a moist intimate admixture of a major portion of dense concrete aggregate particles such as sand, gravel, Haydite, etc., having an apparent density of about 50 pounds per cubic foot or higher and a minor portion of about 5% to about 20% by volume of the total aggregate particles of low density concrete aggregate particles having an apparent density of less than about twenty pounds per cubic foot, at least said dense particles bearing a first coating-film of an aqueous solution of a salt selected from the group consisting of hygroscopic calcium salts and hygroscopic magnesium salts which has been added, for example, in an amount of about 2 to about 4 gallons of an aqueous solution (preferably about 1% to about 3% salt concentration) per cubic foot of aggregate; and an overlying deposit of an oil-in-water mixing-type bituminous emulsion, for example, of 45–55% asphalt content added in an amount of about 0.5 to about 1.5 gallons per cubic foot of aggregate, said dense and said light weight aggregatees being of a size range normally employed with cement binders and water to form mortar, the composition being further characterized in that it is sufficiently free-flowing to be poured from containers and readily mixed with water and a hydraulic cement binder to form a mortar which is readily poured, screeded and troweled without undue loss of volume or segregation of components before setting to form a rigid structure.

In a further embodiment the invention comprises the method of preparing a premixed aggregate suitable for mixing with hydraulic cement and water to form mortar which is readily poured, screeded and troweled without undue loss of volume or segregation of components before it sets, which comprises; mixing an aggregate of a particle size commonly employed with hydraulic cements with a dilute aqueous solution of a salt selected from the group consisting of the hygroscopic salts of calcium and magnesium, sufficient to moisten the aggregate and deposit a uniform coating of said salt on the aggregate particles, then mixing the thus coated particles with a mixing-type bituminous emulsion of the oil-in-water type to coat the surfaces of the particles to form a moist, plastic, pourable mass containing no free water as a separate phase.

There exists a need, which has been met in rather unsatisfactory manner, for what I call an "overlayment concrete." By this I mean a material containing mineral aggregate as the structural component and Portland cement (or other suitable hydraulic cement) as the bonding agent; such material being capable of application to solid structural surfaces such as structural concrete. Typical uses of such overlayment concrete are to repair damaged structural concrete, to coat structural concrete and other like solid structural surfaces with a protective or wearing coat, e. g., to sustain foot and vehicular traffic; and to provide tapered, feathered edges. For example, in a city the need frequently arises to repair worn, gouged or broken sidewalks, tennis courts and other concrete areas. Also, it may be desirable to provide a wearing surface for a structural concrete floor, such wearing surface having insulating properties as well as wearing qualities. And it may be desirable, e. g., in repair jobs, to taper or feather the concrete used for repair purposes so that the new concrete is flush with, or tapers down to the surface of the old concrete.

It will be understood that, in such instances, certain problems and desiderata exist which do not exist or are of lesser importance in the initial operation of laying down a thick, structural concrete floor, sidewalk or the like. The size of initial installations, the thickness of the concrete installed and other factors solve or minimize problems whch are of a major nature in smaller operations such as repair jobs.

Thus, it is desirable to supply the property owner or contractor doing a small repair job, with a bagged aggregate which he can then mix in proper proportions with water and Portland cement; e. g., 5 bags of aggregate and one bag of Portland cement. From the standpoint of the supplier, the bags should be easy to fill; i. e., expensive hand labor in filling should be eliminated, otherwise the filling operation may overprice the bagged aggregate. From the standpoint of all concerned, the bagged aggregate should be easy to handle; it must store and ship without damage or deterioration other than that occasioned by accident or careless handling; and it must remain in properly usable state, i. e., undeteriorated and easily pourable when required.

It is an object of the present invention to provide such a material, i. e., a treated aggregate which can be bagged easily and which fulfills the conditions stated above.

It is a further object of the invention to provide a treated aggregate of this character and a method whereby it can be mixed with water and Portland cement or the like to produce a concrete mix which is efficient for repair purposes and, more generally, as an excellent overlayment material which will bond well to an underlying, thick structural material such as structural concrete and will provide a durable protective layer.

These and other objects of the present invention will be apparent from the ensuing description and the appended claims.

In accordance with the invention of my parent application, I employ a relatively dense aggregate and a lightweight, porous aggregate in admixture, and I treat the aggregate mixture with both aqueous calcium chloride solution and a stable mixing type bituminous emulsion. However, in the present invention I vary the procedure of my parent application in several important respects, as explained below.

The aggregate, as stated, is a mixture of dense and light aggregates. The dense aggregate may be sand and/or gravel; or it may be a synthetic aggregate such as Haydite; or it may be a mixture of such aggregates. (Haydite is a burnt clay aggregate, preferably having a density of about 60 pounds per cubic foot. It is considered a lightweight aggregate compared to sand and gravel weighing about 90 pounds per cubic foot, but it may be considered a dense aggregate for purposes of my present invention. The method of making it is described in Hayde Patent 1,707,395).

The lightweight, porous aggregate is preferably expanded vermiculite or expanded perlite weighing about 8-10 pounds per cubic foot, but other lightweight, porous aggregates may be used such as scoria or pumice.

Generally, the "dense" aggregate should have a density not less than about 50 pounds, preferably not less than about 60 pounds per cubic foot; and the light aggregate should have a density not more than about 20 pounds, preferably not more than about 12 pounds per cubic foot.

The dense and lightweight aggregates may be premixed and then treated in accordance with my present invention, but preferably they are added separately and in the order indicated hereinafter. In either case, i. e., premixing or stagewise addition, the dense aggregate predominates in amount, generally being about 90% of the volume of aggregate but permissibly varying from 80% or less to 95% or slightly more. Thus the volume proportion of lightweight aggregate based on total aggregate volume is preferably 5 to 20%, and is most advantageously about 10%.

In treating the aggregate in accordance with the present invention I employ a suitable mixer such as a paddle mixer operating at about 50 R. P. M.; I first add to the mixer water containing dissolved hygroscopic salt of calcium or magnesium such as calcium chloride and magnesium chloride and preferably calcium chloride; I may then add the entire aggregate (e. g., a 90-10 by volume mixture of sand or Haydite, and No. 4 expanded vermiculite), but I prefer at this stage to add only the dense aggregate; and I then add a specially prepared asphalt emulsion which is described hereinafter. If, in accordance with the preferred procedure, only dense aggregate has been added at this stage, I then add lightweight aggregate. Meanwhile the mixer will be operating and its operation will be continued after the last addition of ingredients until a homogeneous, plastic mass is produced.

I have found that by this means, and especially if the preferred procedure is followed, a plastic, treated aggregate is produced which has the following very useful properties: The water and emulsion render the aggregate desirably plastic, whereby bags can be readily filled, e. g., by feeding the aggregate through a 6 inch helical feed screw into a three inch spout, thence into the bags. By this means, the filling operation is speeded and is much more economical. This desirable plastic property, and other useful properties to be described hereinafter, are more fully developed if the treated aggregate is held for a period of time, e. g., 15 to 30 minutes, in a hopper. It appears that during this holding period, the water in the mixture is absorbed by the porous aggregate and air is displaced from the pores and voids of the porous aggregate and becomes entrapped in the mix in the form of bubbles. The mixture therefore becomes plastic by reason of air bubbles which enable the mix to flow easily into bags yet the plastic flowing properties do not have an adverse effect on bags as there is little or no free water present as a separate liquid phase.

The bagged mixture has a desirable firmness which is highly advantageous because it facilitates handling as compared to an overly plastic or liquid product. This firmness enables bags to be piled ten high without rupture. Also, in the case of bag failure, the product does not squirt and run out. Also, and quite importantly, by reason of the fact that the water is locked up in the pores of the lightweight aggregate, paper bags may be employed of the type mentioned, i. e., outer surface plies of paper and an interior ply of a polyethylene liner which forms a barrier to water vapor. If a highly aqueous aggregate were used, it would have a damaging effect on such bags and would require metal containers.

Moreover when received by the user and opened, the bags will pour their contents easily and can be mixed easily with water and Portland cement, even after long storage and/or shipment.

As a concluding step in the procedure of my invention it may be pointed out that the mixing procedure viewed in its entirety is unorthodox and that such deviation from customary procedure has certain advantages. Thus, it is customary to prepare a concrete mix by first adding Portland cement to water, then adding the aggregate. In my procefure the aggregate is added first and the cement afterwards, preferably after all the water has been added.

This concluding step in the procedure of my invention—the step of adding cement last—has the advantage of producing a much more plastic, easily worked mix in which the components are much less likely to segregate. I attribute these advantages to the displacement of air from the cement particles and its entrapment in the mix in the form of bubbles which are stabilized by the stabilizer which is present in the emulsion.

To recapitulate my invention in its entirety: (1) I employ a mixture of aggregate, such mixture predominating in dense aggregate such as sand, gravel and/or Haydite and containing a small but substantial amount, e. g., 10% by volume of lightweight porous aggregate such as expanded vermiculite or expanded perlite. (2) I preferably add the dense aggregate to water which contains sufficient calcium chloride in accordance with the teachings of my parent application. (3) I then add a stabilized, mixing type bituminous emulsion, preferably stabilized by more than 2% by weight of saponified Vinsol Resin and preferably containing a greater amount of saponified Vinsol Resin than presently available commercial emulsions, as described in more detail hereinafter. This "enriched" emulsion is added in quantities as taught in my parent application. (4) I then add the lightweight aggregate. Meanwhile the ingredients are mixed and mixing is continued until a homogeneous, plastic mass is produced. (5) Then the mix is held for a period of time, usually 15 to 30 minutes, for the water to be thoroughly taken up by the lightweight aggregate. (6) Then paper bags having an interior lining, membrane or vapor barrier of plastic such as a polyethylene, are filled with the plastic mix and are sealed. This filling operation may be carried out by continuous means such as a simple screw feed and a small spout. (7) The bags may be stored and shipped without damage or deterioration other than that occasioned by severe accidents or very careless handling. (8) When used, the bags are opened, the contents are poured into a concrete mixer, water is added and then cement, all in the proper proportions.

Turning now to the calcium chloride solution, the latter is preferably about 1 to 3% concentration although higher and lower concentrations may be employed. The quantity of solution may vary from 2 to 4 gallons, more or less, per cubic foot of aggregate. The amount of the salt is about 0.5 pound to about 4 pounds per 5 cubic feet of aggregate. Too great a quantity of solution will render the product too "mushy" or fluid and too little will render it too stiff and difficult to flow and will not accomplish the desired end results.

The bituminous emulsion may be an asphalt emulsion or other bituminous emulsion of the oil-in-water type, preferably containing about 45 to 55% asphalt, which is stabilized to give a mixing type emulsion, e. g., passing ASTM D31–46 mixing test. This test is now identified as ASTM D977–57. It is used to test emulsions of Type SS–1 which are defined as slow setting asphalt emulsions for fine aggregate mixes in which a substantial quantity of aggregate passes a ⅛ inch sieve and a portion may pass a No. 200 (74 micron) sieve. Thus, the stable mixing type emulsions are those which can be mixed with fine aggregate without breaking. The emulsion is preferably employed in the amount of about one gallon per cubic foot of aggregate, although the amount of emulsion may vary from about ½ to 1½ gallons, more or less, per cubic foot of aggregate. Preferably the emulsion is stabilized by saponified Vinsol Resin (hereinafter referred to simply as "Vinsol Resin"). Presently available commercial emulsions contain about 2% by weight of Vinsol Resin. I have found that superior results are obtained if the emulsion is enriched in Vinsol Resin, to contain not less than about 2.5%. Thus, with these "enriched" emulsions, there is much less tendency for the heavy aggregate particles to separate in the bagged mix, and for the aggregate and cement particles to separate in the final concrete mix and in the end product (cured concrete overlayment).

The following specific examples will serve further to illustrate the practice and advantages of the invention:

*Example 1.*—8 gallons of water containing 5 pounds calcium chloride per 50 gallons (about 1.2% CaCl$_2$) were placed in a mixer followed by 4 cubic feet of sand, 4 gallons of asphalt emulsion containing about 55% of asphalt stabilized by about 2.4% of saponified Vinsol Resin and ½ cubic foot of No. 4 expanded vermiculite. These ingredients were added in the order stated to a plaster mixer while operating at 40 R. P. M. This order of mixing had the following beneficial results: It diminished considerably the amount of breakdown of the vermiculite particles; a larger proportion of air in the voids of the aggregate was displaced and entrapped in the mix in the form of bubbles which were stabilized by the asphalt emulsion; and the mix had a very desirable plasticity and exhibited little tendency for the sand to settle. Thus the mix could be poured easily through a four inch spout and after being transported 600 miles it was still in excellent condition without any noticeable separation of sand. The water was taken up to such an extent by the vermiculite that the mix could be stored and shipped in waterproof bags, yet retain a desirable firmness.

At the end of the 600 mile trip, above-mentioned, Portland cement was added in the proportion of about one bag per 4 cubic feet of aggregate. Water was also added to produce the desired consistency. The concrete mix so produced was employed to overlay sidewalks at a motel. A season's use has indicated excellent result.

Other advantages of the mixing procedure described above are the following: The wet mix screeds and trowels better; little or no water drop out occurs; concrete prepared from these mixes has greater strength; equal slump values are obtainable with 10% less water.

*Example 2.*—Minus 8 mesh dry Haydite was employed as the dense aggregate. This aggregate weighs about 59 pounds per cubic foot. Two cubic feet of this Haydite were added with mixing to 3⅓ gallons of aqueous calcium chloride solution containing ½ pound (1.8%) calcium chloride. Then 2 gallons of the same asphalt emulsion as used in Example 1 were added. Meanwhile mixing was carried out. A very stiff mix resulted which hung to the paddles of the mixer and would not run off like a free-flowing mix. Then 2 pounds (¼ cubic foot) of No. 4 expanded vermiculite was added, while mixing continued. At first the mix appeared to go completely dry and to lose its plasticity, but within one minute air bubbles formed so completely throughout the mass that it would run freely from the paddles of the mixer and flowed easily into a bag.

Two bags of one cubic foot capacity each were filled with this mix, and were sealed. Each weighed 70 pounds. At first the bags were quite soft but the next day they were desirably firm. Apparently during this short time interval the vermiculite and Haydite took up enough of the free water to cause the mass to "firm up."

The procedure set forth in Example 2 has the following advantages, among others: It gives a greater yield, i. e., a greater volume of end product. Also, it employs less water, e. g., 10% less water than my prior procedure when the vermiculite is added first rather than last. Less water means that the mix can be stored more safely in multiple wall paper bags having a polyethylene liner. Also, less water means less freight charges.

The No. 4 vermiculite referred to above has a screen analysis as follows:

Plus 8 mesh _____ Trace
Plus 16 _____percent__ 2
Plus 30 _____do____ 25
Plus 50 _____do____ 72
Plus 100 _____do____ 97

It will, therefore, be apparent that a novel method and novel products have been provided whereby an overlayment type of concrete is readily and economically available to large and small users alike, in a form which is easy to employ and which yields a very high quality end product. The overlayment concrete of the invention may be employed not only for overlayment of structural concrete but also for overlayment of vermiculite concrete and over firm ground, asphaltic concrete, etc.

I claim:

1. A composition of matter consisting essentially of a moist intimate admixture of a major portion of dense concrete aggregate particles having an apparent density of above about fifty pounds per cubic foot and a minor portion of about 5% to about 20% by volume of the total aggregate of a low density concrete aggregate having an apparent density of less than about twenty pounds per cubic foot, at least said dense particles bearing a first coating-film of an aqueous solution of a salt selected from the group consisting of hygroscopic calcium salts and hygroscopic magnesium salts, and an overlying deposit of an oil-in-water stable mixing-type bituminous emulsion such as that passing ASTM D631–46 mixing test, said dense and said light weight aggregates being of a size range normally employed with hydraulic binders and water to form mortar, said composition being further characterized in that it is an essentially particulate aggregate which is sufficiently free-flowing to be poured from containers and readily mixed with water and a hydraulic cement binder to form a mortar which is readily poured, screeded and troweled without undue loss of volume or segregation of components before setting to form a rigid structure.

2. The composition of claim 1 wherein the hygroscopic salt is calcium chloride.

3. The composition of claim 1 wherein the proportions of hygroscopic salt in the first film are about 0.5 to about 4 pounds per 5 cubic feet of aggregate.

4. The composition of claim 1 wherein the low density aggregate is expanded vermiculite.

5. The composition of claim 1 wherein the low density aggregate is expanded perlite.

6. The composition of claim 1 wherein the dense aggregate is sand.

7. The composition of claim 1 wherein the dense aggregate is Haydite.

8. The composition of claim 1 wherein the asphalt emulsion is stabilized by more than 2% of a saponified petroleum insoluble, solvent extract pinewood resin, which is characterized by freedom from wood rosin, solubility in alcohol, a methoxy content of 3–6%, an acid number of about 100 and a melting point of about 125° C.

9. The method of preparing a premixed aggregate suitable for mixing with hydraulic cement and water to form mortar which is readily poured, screeded and troweled without undue loss of volume or segregation of components before it sets, which comprises; providing a mixture of a major proportion of a dense concrete aggregate having an apparent density of at least about 50 pounds per cubic foot, a minor proportion of about 5 to about 20% by volume of the total aggregate, of a low density concrete aggregate having an apparent density of less than about 20 pounds per cubic foot, said aggregates having a particle size commonly employed with hydraulic cements mixing said mixed aggregates with a dilute aqueous solution of a salt selected from the group consisting of the hygroscopic salts of calcium and magnesium, sufficient to moisten the aggregate and deposit a uniform coating of said salt on the aggregate particles, then mixing the thus coated particles with a stable mixing-type bituminous emulsion of the oil-in-water type passing ASTM D631–46 mixing test, to completely coat the surfaces of the particles to form a plastic, esesntially particulate pourable aggregate mass.

10. The method of preparing a pre-mixed aggregate suitable for mixing with hydraulic cement binder and water which comprises; mixing dense concrete aggregate particles having an apparent density of at least about 50 pounds per cubic foot, with a dilute aqueous solution of a salt selected from the group consisting of hygroscopic calcium salts and hygroscopic magnesium salts to moisten the particles of said aggregate, adding and mixing therewith an oil-in-water stable mixing-type bituminous emulsion passing ASTM D631–46 mixing test to deposit a film of said emulsion on said moist particles, adding and mixing therewith a minor portion of about 5% to about 20% by volume of the total aggregate, of low density concrete aggregate particles having an apparent density of less than about 20 pounds per cubic foot and recovering a moist composition which is an essentially particulate aggregate and is sufficiently free-flowing to be poured from a container and be readily mixed with water and a hydraulic cement binder to form mortar which is readily poured, screeded and troweled without undue loss of volume or segregation of components before it sets.

11. The method of claim 10 wherein the proportions of said salt is about 0.5 to about 4 pounds per 5 cubic feet of total aggregate, and the asphalt emulsion contains about 45% to about 55% asphalt and is added in the amount of about 0.5 to about 1.5 gallons per cubic foot of total aggregate.

12. The method of claim 10 wherein the asphalt emulsion is stabilized by more than 2.0% of a saponified petroleum insoluble, solvent extracted pinewood resin which is characterized by freedom from wood rosin, solubility in alcohol, a methoxy content of 3–6%, an acid number of about 100 and a melting point of about 125° C.

13. The process of claim 10 wherein the salt is calcium chloride.

14. The method of preparing a pre-mixed aggregate suitable for mixing with hydraulic cement and water to form mortar which comprises; mixing dense aggregate particles having an apparent density of at least about 50 pounds per cubic foot, and low density concrete aggregate particles having an apparent density of less than about 20 pounds per cubic foot, said aggregates being of a particle size commonly employed with hydraulic cement binders, with about 2 to 4 gallons per cubic foot of aggregate, of an aqueous solution of a salt selected from the group consisting of calcium chloride and magnesium chloride in an amount equivalent to about 0.5 to about 4 pounds of salt per 5 cubic feet of aggregate, to moisten the aggregate, mixing the moist aggregate with an oil-in-water stable mixing-type bituminous emulsion passing ASTM D631–46 mixing test, said emulsion containing about 45% to about 55% asphalt in an amount of about 0.5 to about 1.5 gallons of emulsion per cubic foot of aggregate to form a uniform mixture, and recovering the resultant aggregate composition characterized by being an essentially particulate aggregate and is sufficiently free-flowing to be poured from containers and readily mixed with water and a hydraulic cement binder to form mortar which is readily poured, screeded and troweled without undue loss of volume and undue segregation of components before setting to form a rigid structure.

15. The process of claim 14 wherein the asphalt emulsion is stabilized by a saponified petroleum insoluble, solvent extracted pinewood resin which is characterized by freedom from wood rosin, solubility in alcohol, a methoxy content of 3–6%, an acid number of about 100 and a melting point of about 125° C.

16. The process of claim 14 wherein the salt is calcium chloride.

References Cited in the file of this patent

UNITED STATES PATENTS

| Number | Name | Date |
| --- | --- | --- |
| 1,563,755 | Leonardt | Dec. 1, 1925 |
| 2,074,758 | Reynolds | Mar. 23, 1937 |
| 2,335,978 | Vogt | Dec. 7, 1943 |
| 2,355,966 | Goff | Aug. 15, 1944 |
| 2,376,447 | Mullin | May 22, 1945 |
| 2,377,491 | Goodrich et al. | June 5, 1945 |
| 2,399,411 | Watts et al. | Apr. 30, 1946 |
| 2,468,533 | Worson | Apr. 26, 1949 |
| 2,483,806 | Buckley et al. | Oct. 4, 1949 |
| 2,483,835 | Manzer | Oct. 4, 1949 |
| 2,677,165 | Copenhaver | May 4, 1954 |